United States Patent
Gretz

(10) Patent No.: US 7,442,079 B1
(45) Date of Patent: *Oct. 28, 2008

(54) ELECTRICAL FITTING WITH INTERNAL CABLE RETAINER

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/001,096

(22) Filed: Dec. 10, 2007

Related U.S. Application Data

(63) Continuation-in-part of application No. 11/707,582, filed on Feb. 16, 2007, now Pat. No. 7,381,088.

(51) Int. Cl.
*H01R 13/73* (2006.01)

(52) U.S. Cl. ...................... 439/557; 174/661

(58) Field of Classification Search .............. 439/557; 174/661, 663, 669
See application file for complete search history.

(56) References Cited

U.S. PATENT DOCUMENTS

| | | | |
|---|---|---|---|
| 2,540,999 A | 2/1951 | Thomas, Jr. | |
| 2,577,748 A | 12/1951 | Gillespie | |
| 2,639,927 A | 5/1953 | Billeter | |
| 2,973,212 A | 2/1961 | Rose | |
| 5,594,209 A | 1/1997 | Nattel et al. | |
| 5,731,543 A | 3/1998 | Jorgensen | |
| 6,034,326 A * | 3/2000 | Jorgensen | 174/660 |
| 6,335,488 B1 | 1/2002 | Gretz | |
| 6,352,439 B1 * | 3/2002 | Stark et al. | 439/142 |
| 6,444,907 B1 | 9/2002 | Kiely | |
| 6,555,750 B2 * | 4/2003 | Kiely | 174/657 |
| 7,057,107 B2 * | 6/2006 | Auray et al. | 174/659 |
| 7,211,744 B2 * | 5/2007 | Jorgensen | 174/668 |

* cited by examiner

*Primary Examiner*—Thanh-Tam T Le

(57) ABSTRACT

An electrical fitting with an improved arrangement on the trailing end for the quick connection of electrical cables. The fitting includes a connector body with a cavity in the trailing end and a cable retainer secured therein. The tubular cable retainer is constructed of spring steel and includes a flat portion and an arcuate portion. A single cable-retaining tang extends inwardly from the flat portion and includes notched edges at its juncture with the tubular body, thereby enhancing the resiliency of the tang. A wide cable-gripping surface on the cable-retaining tang enables secure gripping of an electrical cable as it is inserted within the trailing end of the fitting. End legs on the cable-retaining tang are at an angle with respect to the edge of the cable retainer thereby orienting the end legs with the grooves on an armored or similar electrical cable.

12 Claims, 16 Drawing Sheets

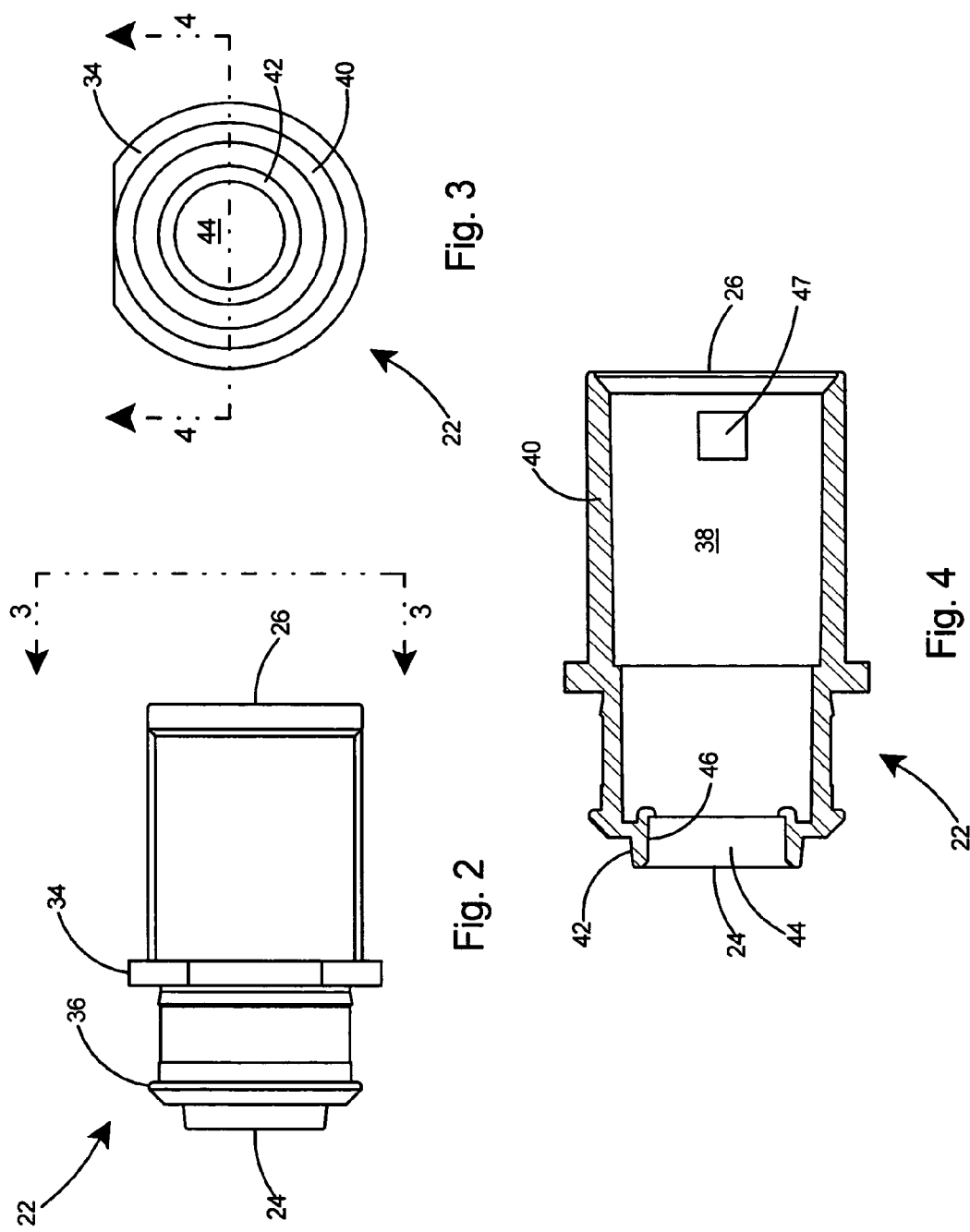

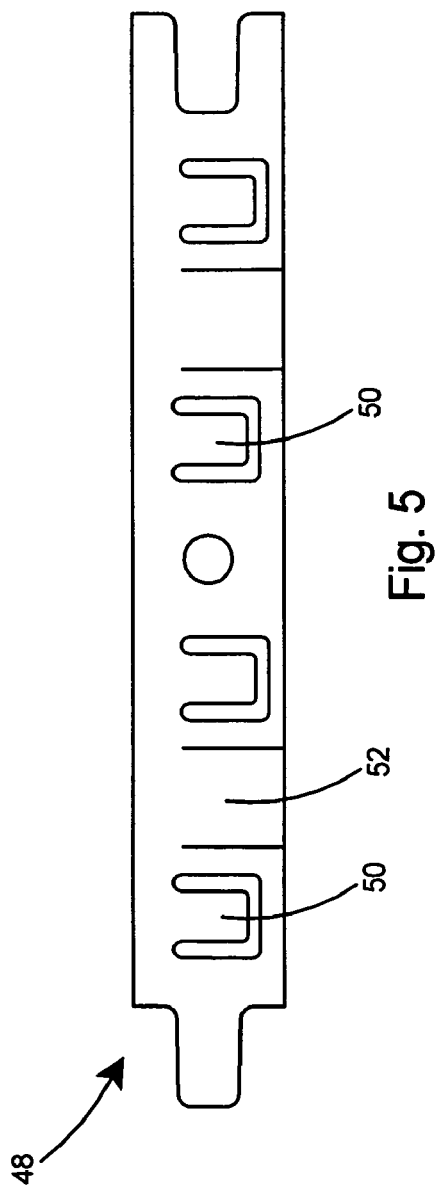
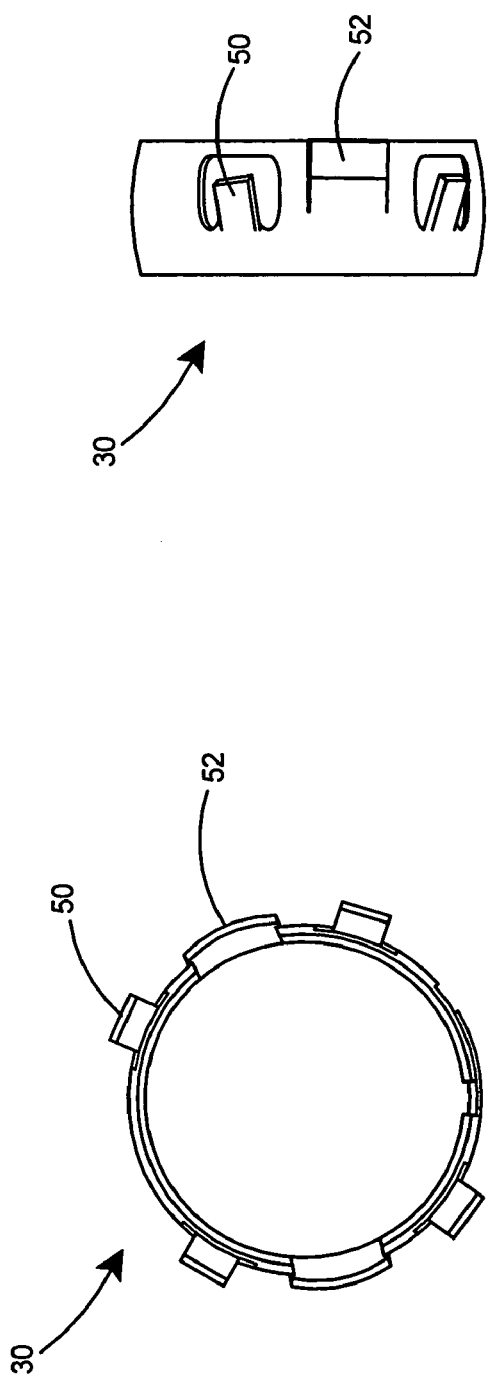
Fig. 5
Fig. 6
Fig. 7

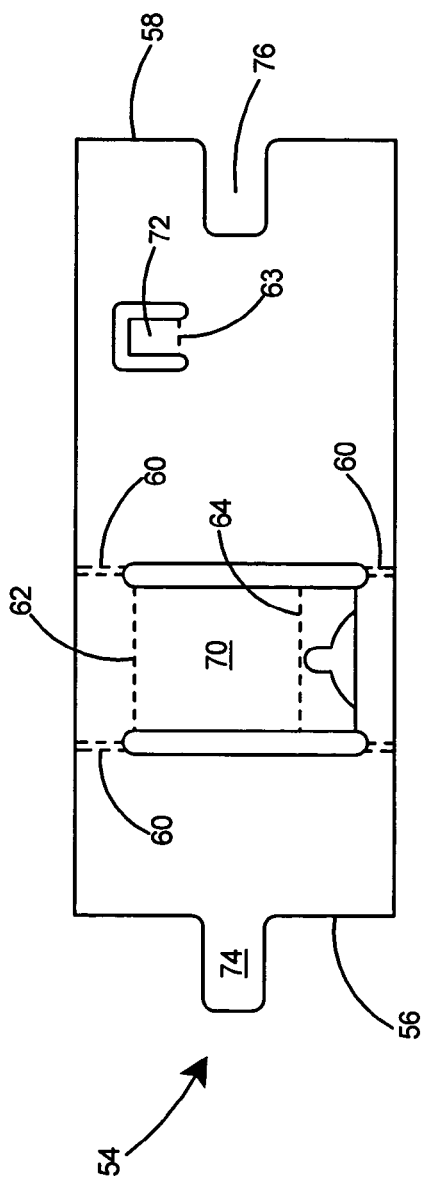
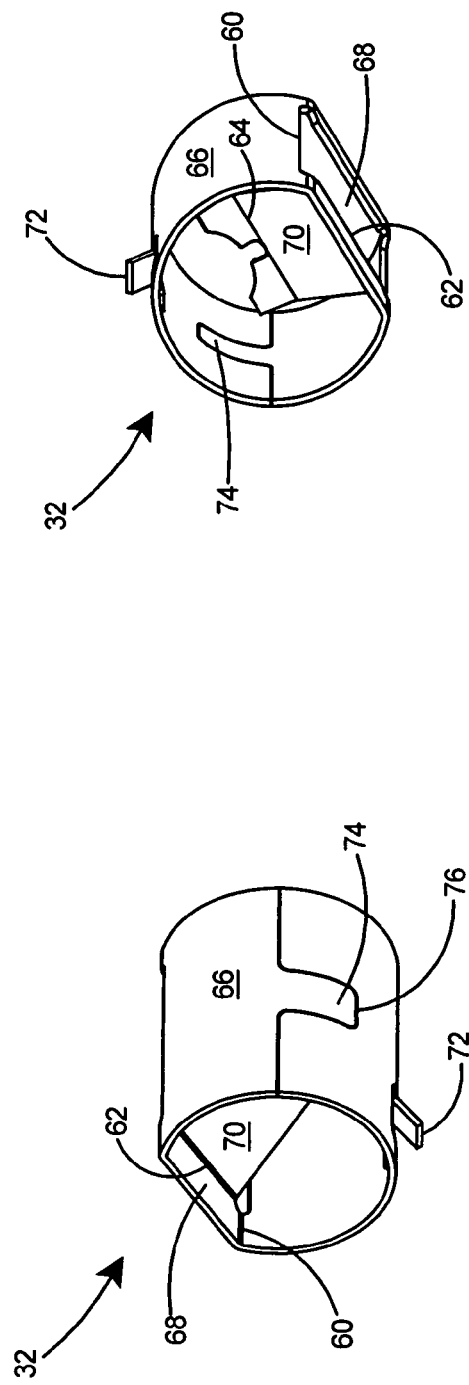
Fig. 8
Fig. 9
Fig. 10

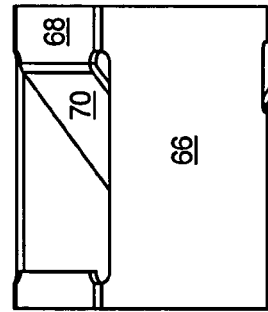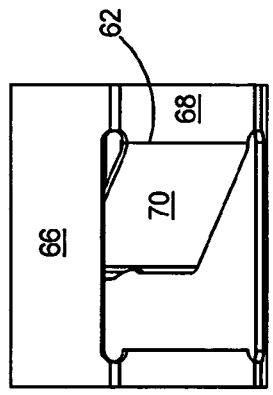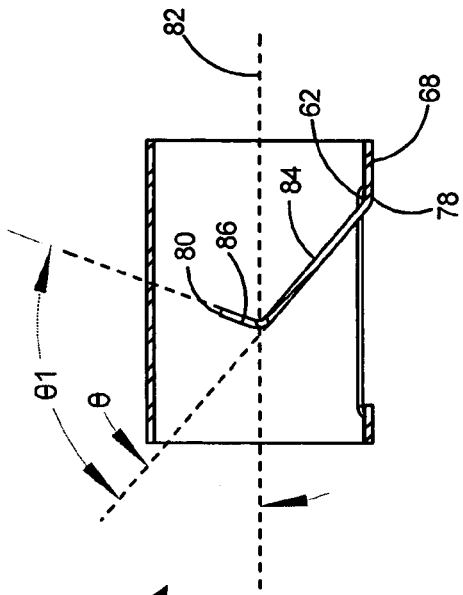

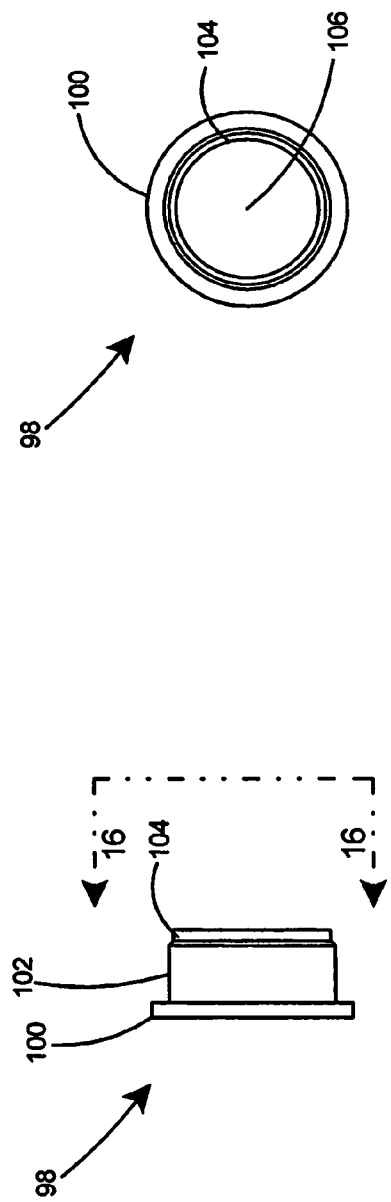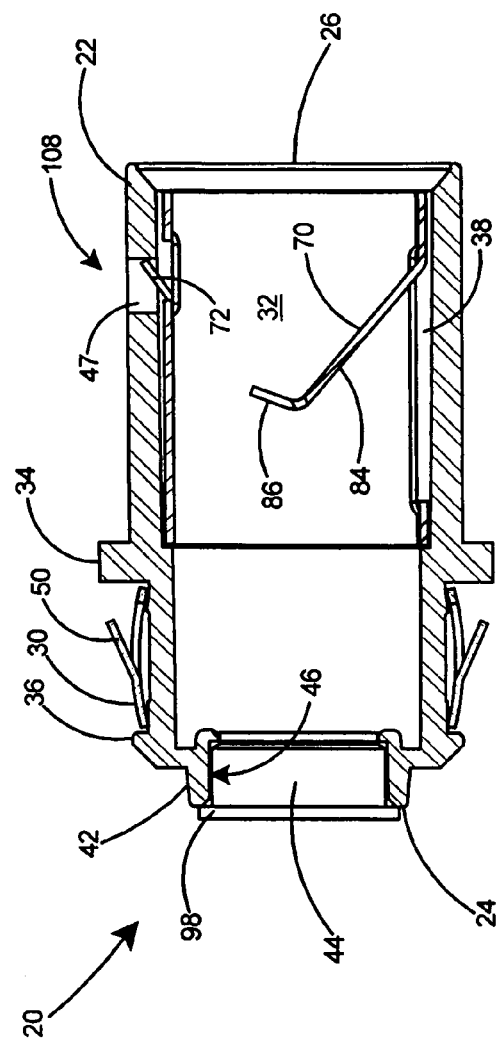

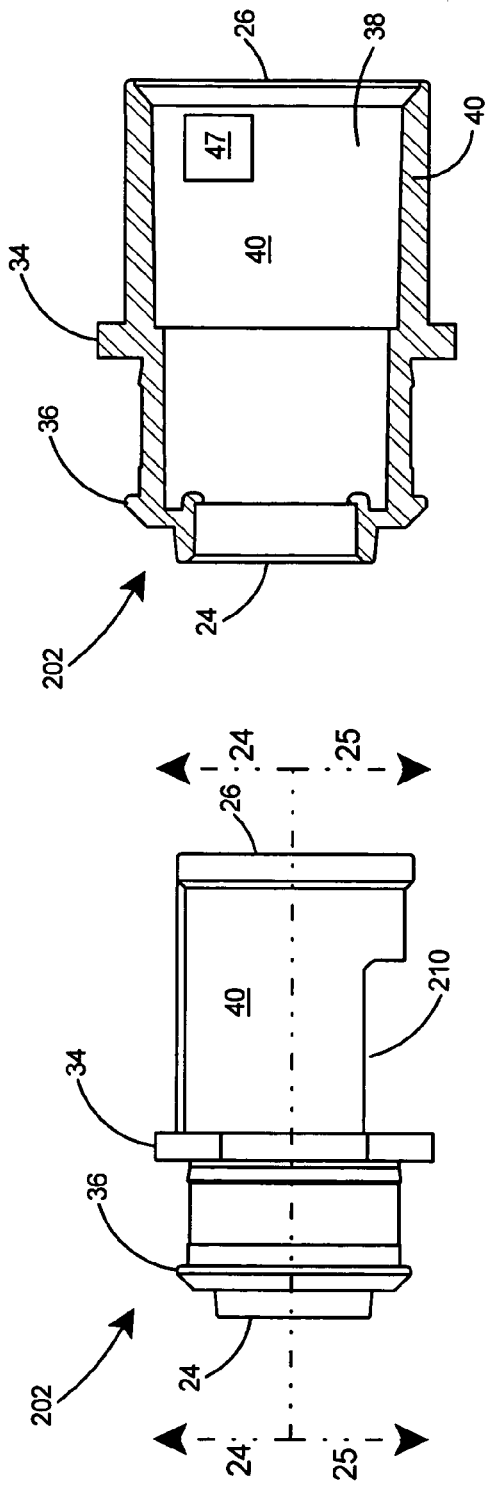
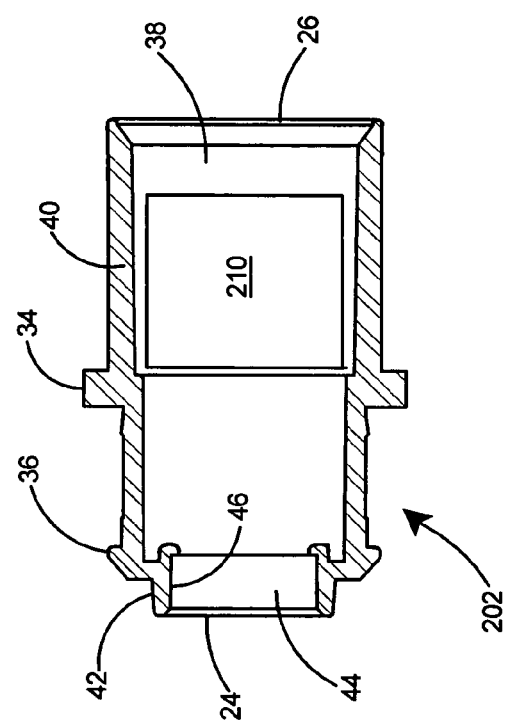
Fig. 23
Fig. 24
Fig. 25

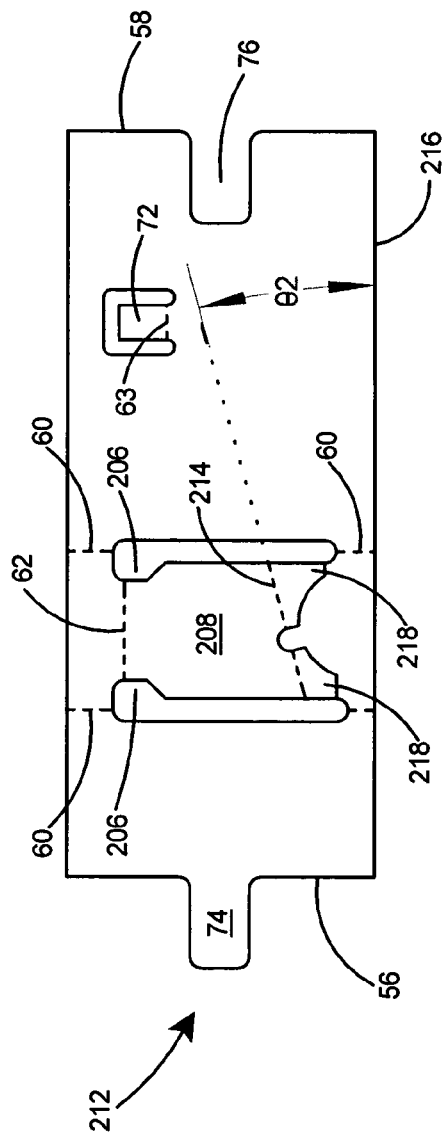
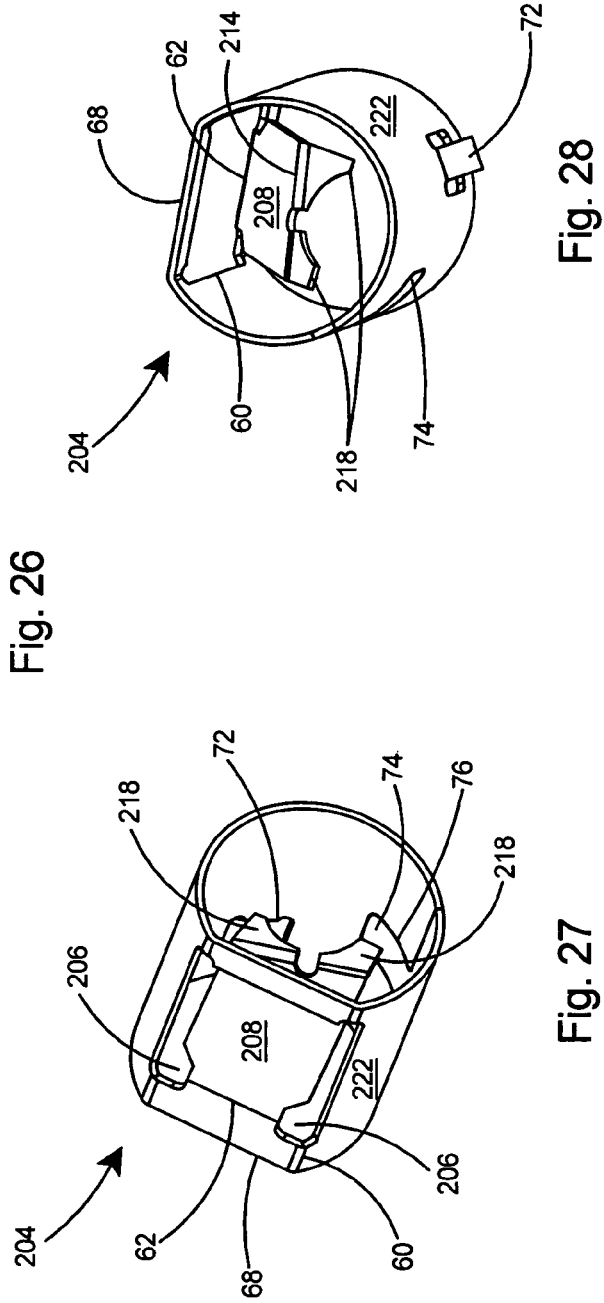
Fig. 26
Fig. 27
Fig. 28

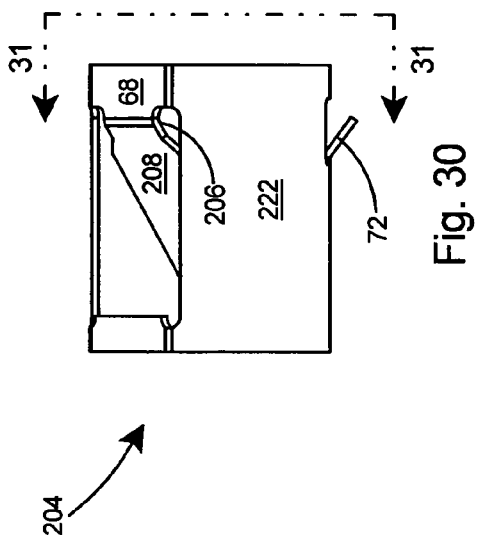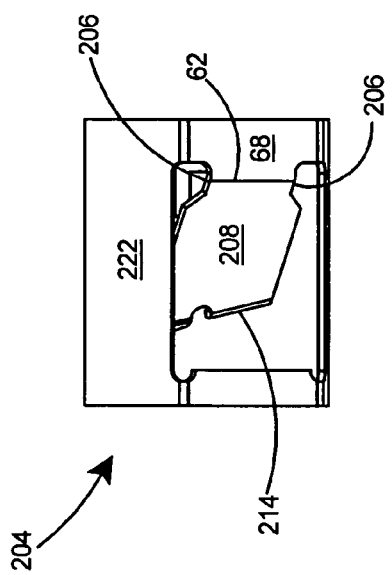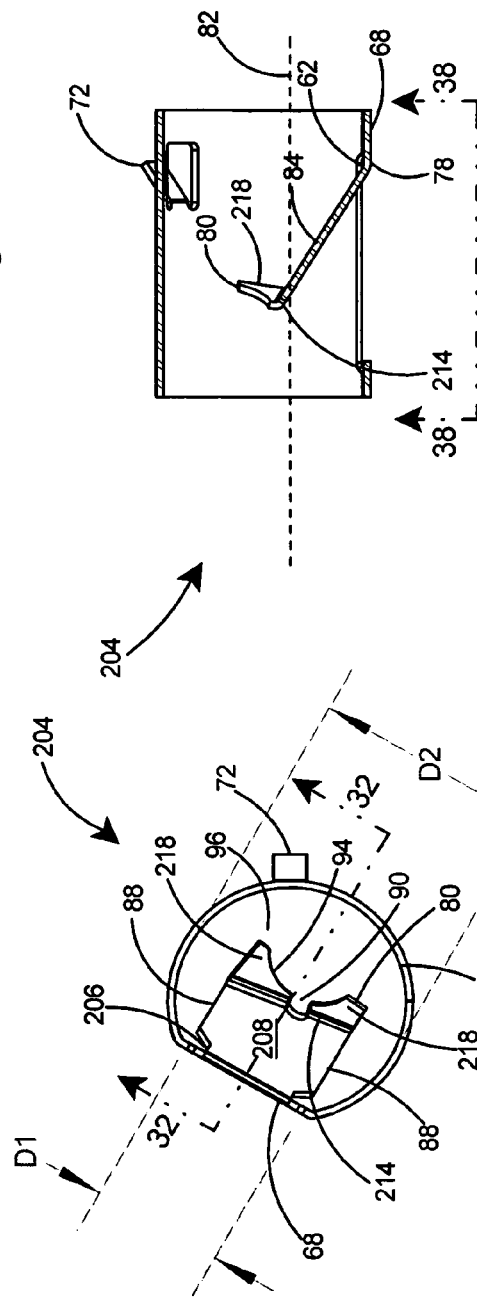

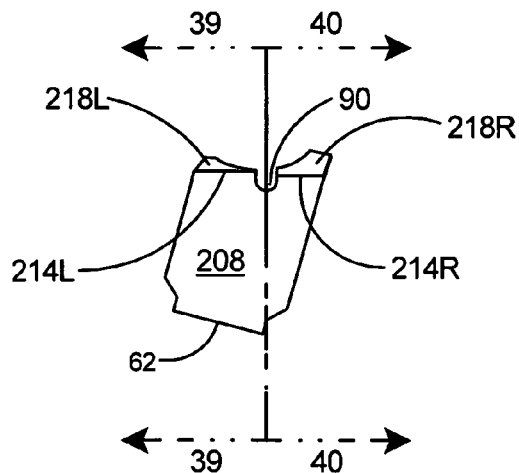
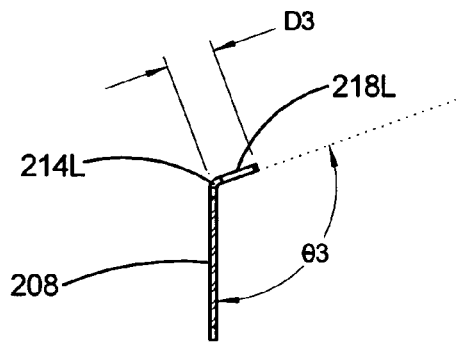
Fig. 38
Fig. 39
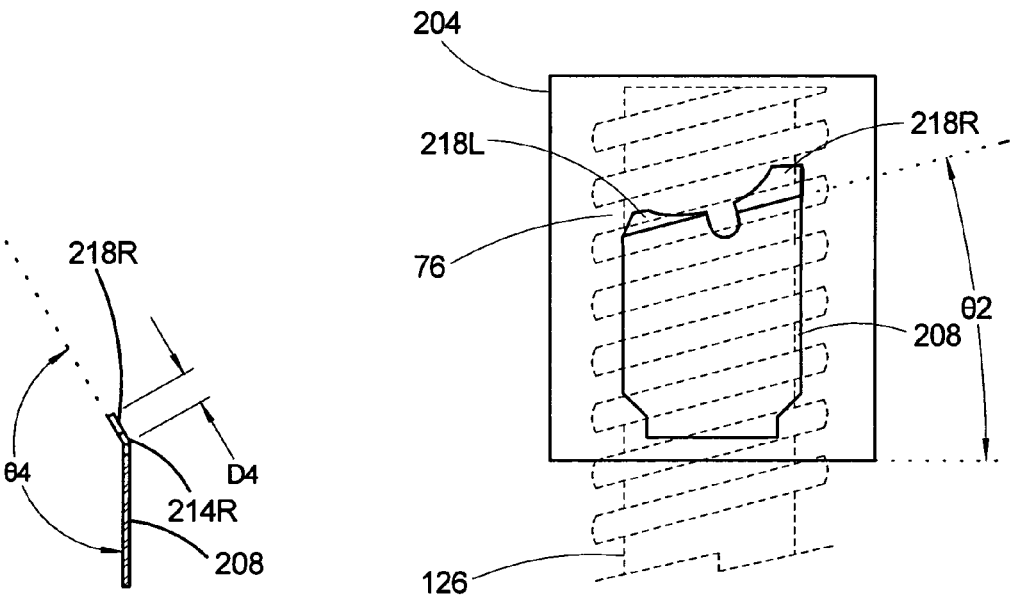
Fig. 40
Fig. 41

ELECTRICAL FITTING WITH INTERNAL CABLE RETAINER

This application is a Continuation-In-Part of U.S. patent application Ser. No. 11/707,582 filed Feb. 16, 2007 now U.S. Pat. No. 7,381,088 which is incorporated herein by reference in its entirety for all purposes.

FIELD OF THE INVENTION

This invention relates to fittings for connecting electrical cables to a panel and specifically to an electrical fitting having an improved arrangement on the trailing end for receiving an electrical cable or conduit.

BACKGROUND OF THE INVENTION

Electrical fittings are commonly used to connect electrical cables to electrical panels or boxes. In recent years, quick connect electrical fittings have become increasingly popular.

Several prior art connectors have been proposed for the attachment of electrical cables or conduits to panels or electrical boxes. Some of these, such as that shown in U.S. Pat. No. 6,335,488 to Gretz, include a tubular body with a cavity on the trailing end and a cylindrical-shaped split ring that is inserted into the cavity. The prior art split ring included a plurality of cable gripping tangs extending inwards of the cylindrical ring for securing a cable to the trailing end of the connector. Although the prior art split ring adequately performed the function of gripping a cable, as a result of the multiple tangs, the electrical fitting was mechanically complex and relatively expensive to produce.

An improved quick-connect electrical fitting was disclosed in co-pending commonly owned application Ser. No. 11/707,582, which has been incorporated herein by reference above. The electrical fitting included an improved cable retaining ring having simpler construction than those described in the prior art. The cable retaining ring included a single tang for gripping and holding an inserted cable, and, as a result of the simpler construction of the cable retaining ring, was easier to manufacture and cheaper to produce than prior art internal cable retaining rings. By providing a single tang on the cable retaining ring, the tang is substantially wider than in prior art cable retaining rings having a plurality of cable retaining tangs. The wider cable retaining tang therefore places a much wider cable-gripping surface within the groove of, for example, an armored cable, thereby gripping the cable tighter and improving the strain relief properties of the electrical fitting.

The cable retaining ring of the present invention improves upon the electrical fitting disclosed in Ser. No. 11/707,582 by providing a notched area at the juncture with the cable retaining ring, thereby reducing the width of the single tang at the juncture. The reduced width of the tang at the juncture with the ring allows the tang to flex more easily thereby making it easy for an installer to insert an electrical cable or conduit into the fitting when connecting it to a panel or an electrical box.

SUMMARY OF THE INVENTION

The invention is an electrical fitting having an improved arrangement on the trailing end for securing electrical cables thereto. A connector body having a cavity in the trailing end includes a cable retainer secured therein. The cable retainer includes a substantially tubular body and is constructed of spring steel. The tubular body includes a flat portion and an arcuate portion. A single cable retaining tang extends inwardly from the flat portion. The cable tang is notched at the juncture with the ring to enable easier flexing of the tang. Providing the cable retaining tang on the flat portion of the tubular body enables a straight bend line between the cable retaining tang and the tubular body, thereby allowing the tang to flex easily. The cable retaining tang includes a wide cable gripping surface to enable secure gripping of an electrical cable as it is inserted within the trailing end of the fitting.

OBJECTS AND ADVANTAGES

Several advantages are achieved with the electrical fitting of the present invention, including:

(1) The electrical fitting includes a cable retainer that is of simplified construction, with a single cable retaining tang projecting inward from the tubular body of the cable retainer. The simplified construction enables the electrical fitting to be easily manufactured at an economical cost.

(2) The cable retaining tang of the electrical fitting projects from a flat portion of the cable retainer and includes a straight bend line to enhance the flexibility of the tang and thereby enabling easy insertion of electrical cables within the trailing end of the connector body.

(3) The cable retaining tang is of greater width and includes a wider cable gripping surface, thereby improving the ability of the electrical fitting to securely grip electrical cables therein.

(4) The cable retaining tang is notched on both edges at its juncture with the ring, thereby enabling easier insertion of cables or conduit into the fitting.

These and other objects and advantages of the present invention will be better understood by reading the following description along with reference to the drawings.

DESCRIPTION OF THE DRAWINGS

FIG. 2 is a side view of a connector body that forms a portion of the electrical fitting shown in FIG. 1.

FIG. 3 is an end view of the connector body as viewed from line 3-3 of FIG. 2.

FIG. 4 is a sectional view of the connector body taken along line 4-4 of FIG. 2.

FIG. 5 is a plan view of a blank used to form a cylindrical ring fastening arrangement for the leading end of the connector body in FIG. 2.

FIG. 6 is an end view of a cylindrical ring that has been formed from the blank of FIG. 5.

FIG. 7 is a side view of the cylindrical ring of FIG. 6.

FIG. 8 is a plan view of a blank used to form a cable retainer for the trailing end of the connector body in FIG. 2.

FIG. 9 is a perspective view of a cable retainer that has been formed from the blank of FIG. 8.

FIG. 10 is another perspective view of the cable retainer of FIG. 9.

FIG. 11 is a side view of the cable retainer of FIG. 9.

FIG. 12 is another side view of the cable retainer of FIG. 9.

FIG. 13 is an end view of the cable retainer as viewed from line 13-13 of FIG. 12.

FIG. 14 is a sectional view of the cable retainer as taken along line 14-14 of FIG. 13.

FIG. 15 is a side view of an insert that forms a portion of the electrical fitting of the present invention.

FIG. 16 is an end view of the insert as viewed from line 16-16 of FIG. 15.

FIG. 17 is a sectional view of the first embodiment of the electrical fitting including a cable retaining tang secured in the trailing end of the connector body and the insert of FIG. 15 inserted in the leading end of the connector body.

FIG. 23 is a side view of a connector body that forms a portion of the electrical fitting shown in FIG. 22.

FIG. 24 is an end view of the connector body as viewed from line 24-24 of FIG. 23.

FIG. 25 is a sectional view of the connector body taken along line 25-25 of FIG. 24.

FIG. 26 is a plan view of a blank used to form a cable retainer for the trailing end of the connector body in FIG. 23.

FIG. 27 is a perspective view of the preferred embodiment of a cable retainer that has been formed from the blank of FIG. 26.

FIG. 28 is another perspective view of the cable retainer of FIG. 27.

FIG. 29 is a side view of the cable retainer of FIG. 27.

FIG. 30 is another side view of the cable retainer of FIG. 27.

FIG. 31 is an end view of the cable retainer as viewed from line 31-31 of FIG. 30.

FIG. 32 is a sectional view of the cable retainer as taken along line 32-32 of FIG. 31.

FIG. 38 is a plan view of the preferred embodiment of the cable-retaining tang as taken along line 38-38 of FIG. 32.

FIG. 39 is a sectional view of the cable-retaining tang taken along line 39-39 of FIG. 38.

FIG. 40 is a sectional view of the cable-retaining tang taken along line 40-40 of FIG. 38.

FIG. 41 is a conceptual view of the cable-retaining tang and cable retainer and depicting a metal clad electrical cable inserted and locked therein by the cable-retaining tang.

INDEX TO REFERENCE NUMERALS IN DRAWINGS

| | |
|---|---|
| 20 | electrical fitting, first embodiment |
| 22 | connector body |
| 24 | leading end |
| 26 | trailing end |
| 28 | fastening arrangement |
| 30 | panel-engaging ring |
| 32 | cable retainer |
| 34 | central flange |
| 36 | end flange |
| 38 | cavity |
| 40 | wall |
| 42 | partial closure |
| 44 | opening in partial closure |
| 46 | edge of partial closure |
| 47 | opening in surrounding wall |
| 48 | panel-engaging ring blank |
| 50 | panel engagement tang |
| 52 | grounding tang |
| 54 | cable retainer blank |
| 56 | first end |
| 58 | second end |
| 60 | lateral bend line |
| 62 | first bend line |
| 63 | bend line |
| 64 | second bend line |
| 66 | tubular body of cable retainer |
| 68 | flat portion |
| 70 | cable retaining tang |
| 72 | locking tang |
| 74 | tab |
| 76 | groove |
| 78 | proximate end of cable retaining tang |
| 80 | distal end of cable retaining tang |
| 82 | longitudinal axis |
| 84 | first leg |
| 86 | second leg |
| 88 | side edges of cable retaining tang |
| 90 | U-shaped notch |
| 92 | end portion of cable retaining tang |
| 94 | arcuate edge |
| 96 | flat edge |
| 98 | insert |
| 100 | end flange of insert |
| 102 | smooth seat |
| 104 | nose section of insert |
| 106 | center bore of insert |
| 108 | securing arrangement |
| 110 | aperture in panel |
| 112 | panel |
| 114 | electrical fitting, alternative embodiment |
| 116 | fastening arrangement, alternative embodiment |
| 118 | threads |
| 120 | leading end |
| 122 | connector body, alternative embodiment |
| 124 | nut |
| 126 | electrical cable |
| 200 | electrical fitting, second and preferred embodiment |
| 202 | connector body |
| 204 | cable retainer |
| 206 | notch |
| 208 | cable retaining tang |
| 210 | opening |
| 212 | blank |
| 214 | bend line |
| 214L | left bend line |
| 214R | right bend line |
| 216 | edge of blank |
| 218 | leg of cable retaining tang |
| 218L | left leg of cable retaining tang |
| 218R | right leg of cable retaining tang |
| 222 | tubular body of cable retainer |
| 224 | small diameter electrical cable |
| 226 | groove |
| 228 | large diameter electrical cable |
| 230 | groove |

-continued

| | |
|---|---|
| D1 | width of single cable retaining tang |
| D2 | inner diameter of cable retainer |
| D3 | length of left leg |
| D4 | length of right leg |
| θ | angle of first leg with respect to longitudinal axis |
| θ1 | angle of second leg with respect to first leg |
| θ2 | angle of second bend line with respect to edge of blank |
| θ3 | angle of left leg from cable-retaining tang |
| θ4 | angle of right leg from cable-retaining tang |

DETAILED DESCRIPTION OF THE INVENTION

Figure 1:
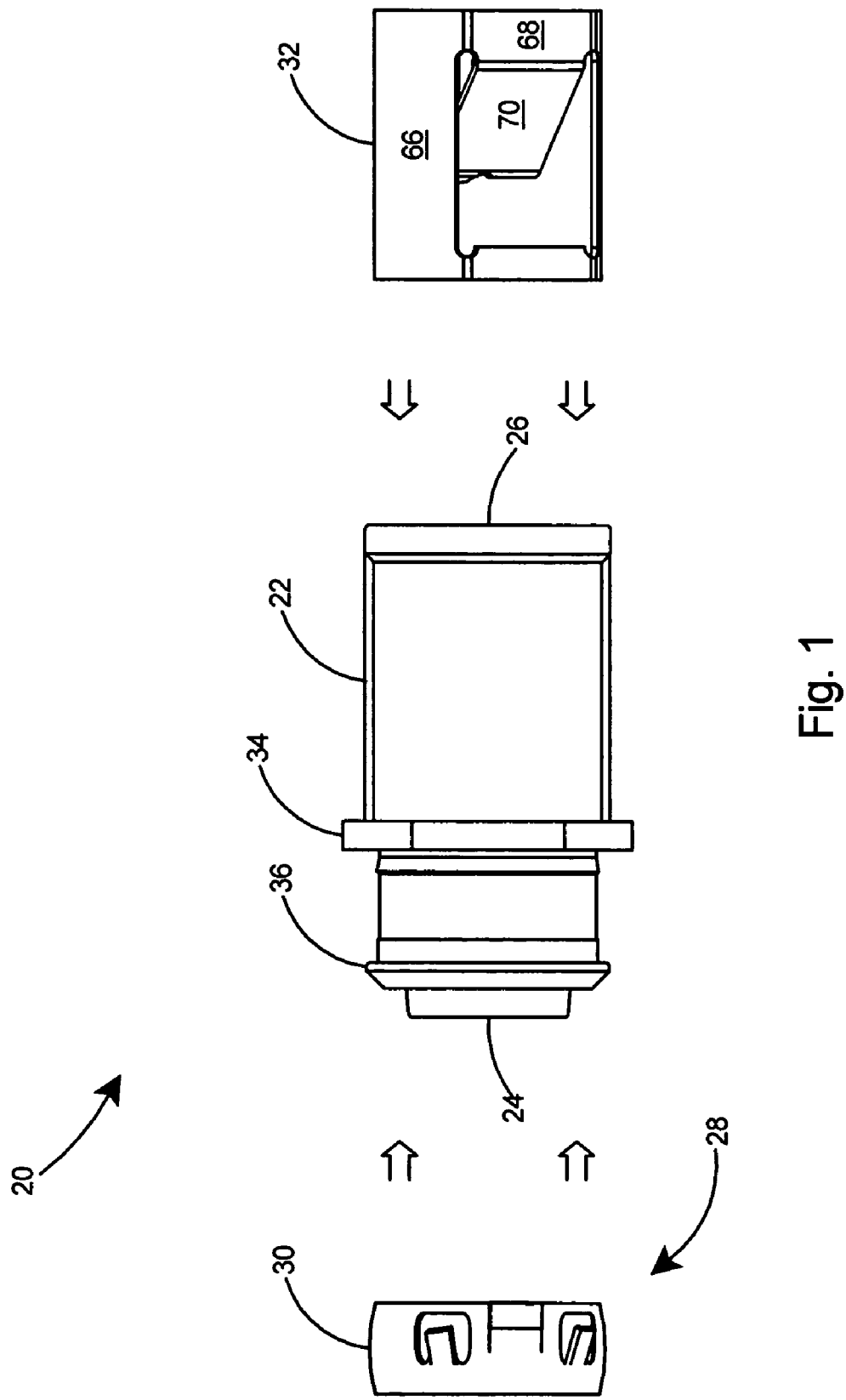
FIG. 1 is an exploded side view of a first embodiment of an electrical fitting according to the present invention.

With reference to FIG. 1 there is shown a first embodiment of the present invention, an electrical fitting 20 having an improved arrangement for the securing of electrical cables thereto. The first embodiment of the electrical fitting 20 includes a connector body 22 including a leading end 24 and a trailing end 26. A fastening arrangement 28 on the leading end 24 of the connector body 22 includes a cylindrical panel-engaging ring 30 for securing the connector body 22 to a panel (not shown). A cable retainer 32 is inserted within the trailing end 26 of the connector body 22 to form the electrical fitting 20 of the present invention.

With reference to FIGS. 2-4, the connector body 22 includes a central flange 34 between the trailing end 26 and the leading end 24, an end flange 36 on the leading end 24, and a cavity 38 including a surrounding wall 40 in the trailing end 26. The connector body 22 further includes a partial closure 42 on the leading end 24, an opening 44 in the partial closure 42, and edges 46 on the partial closure 42 surrounding the opening 44. An opening 47 is provided in the surrounding wall 40 of the connector body.

Referring to FIGS. 5-7, the cylindrical panel-engaging ring 30 of the first embodiment is formed from a blank 48 as shown in FIG. 5 into a substantially cylindrical shape as shown in FIGS. 6 and 7. The panel-engaging ring 30 includes panel engagement tangs 50 and grounding tangs 52 bent outwards of the ring.

The main advantages of the present invention are realized from the arrangement of the cable retainer 32 as shown in FIGS. 8-14. As shown in FIG. 8, the cable retainer 32 is formed from a flat blank 54 of spring steel having two ends 56 and 58. The blank 54 includes bend lines 60 laterally across the blank 54 and separate bend lines 62, 63, and 64 longitudinally along the blank. The blank 54 of FIG. 8 will be formed into a substantially tubular body 66 as shown in FIGS. 9 and 10 but with a flat portion 68 formed between bend lines 60. A cable retaining tang 70 is formed by bending inward of the tubular body 66 at bend line 62 and a locking tang 72 formed by bending outward of the tubular body 66 at bend line 63. The cable retaining tang 70 is bent inward a second time at bend line 64. The first end 56 of the blank 54 includes a tab 74 and the second end 58 includes a groove 76. When the blank 54 is formed into the substantially tubular cable retainer 32, as shown in FIGS. 9 and 10, the tab 74 extends into the groove 76.

With reference to FIGS. 11-14, the cable retainer 32 includes a substantially tubular body 66 with a flat portion 68, a cable retaining tang 70 projecting inward from the flat portion 68 of the tubular body 66, and a locking tang 72 projecting outward from the tubular body 66. As shown in FIG. 14, the cable retaining tang 70 includes a proximate end 78 at the juncture of the cable retaining tang 70 with the flat portion 68 and a distal end 80. A first bend line 62 at the proximate end 78 in the flat portion 68 of the tubular body 66 is a straight line as is the second bend line 64 near the distal end 80. The tubular body 66 of the cable retainer 32 includes a longitudinal axis 82 and the first bend line 62 is at an angle θ of between 35 and 45 degrees with respect to the longitudinal axis 82. The cable retaining tang 70 includes a first leg 84 between the first bend line 62 and the second bend line 64, a second leg 86 between the second bend line 64 and the distal end 80, and the second leg 86 is bent at an angle θ1 of between 65 and 75 degrees with respect to the first leg 84. As shown in FIG. 13, the cable retaining tang 70 includes side edges 88 and a U-shaped notch 90 centered on the distal end 80. The notch 90 divides the second leg 86 of the cable retaining tang 70 into two end portions 92. The end portions 92 of the cable retaining tang 70 include an arcuate edge 94 extending from the notch 90 and a flat edge 96 extending from the arcuate edge 94 to each of the side edges 88.

A tubular insert 98 which may be used with the electrical fitting of the present invention is depicted in FIGS. 15 and 16. The insert 98 includes an end flange 100, a smooth seat 102, a necked-down nose section 104, and a center bore 106. As shown in FIG. 17, the insert 98 may be pressed into the opening 44 of the partial closure 42 on the leading end 24 of the connector body 22 to substantially cover the edges 46 of the opening 44. The insert 98 acts to protect the outer sheaths of any wiring (not shown) that is later advanced through the opening 44 within the partial closure 42 of the connector body 22. The insert 98 is preferably molded of plastic.

As depicted in FIG. 17, the cable retainer 32 includes the locking tang 72 that along with the opening 47 in the trailing end 26 of the connector body 22 forms a securing arrangement 108 for locking the cable retainer 32 within the cavity 38 in the trailing end 26 of the connector body 22. As the cable retainer 32 is typically formed of spring steel and is a split ring, it can be compressed or biased inwards and inserted into the cavity 38 at the trailing end 26 of the connector body 22. The locking tang 72 of the cable retainer 32 is aligned with the opening 47 in the trailing end 26 of the connector body 22 as the cable retainer 32 is compressed and inserted therein. After the cable retainer 32 has been inserted into the cavity 38, the cable retainer 32 is released and springs outward to its unbiased shape and the locking tang 72 extends into the opening 47 in the connector body 22 thereby locking the cable retainer 32 within the cavity 38.

With reference to FIG. 17, the panel-engaging ring 30 is typically constructed of spring steel and is biased outward or expanded in size and slipped over end flange 36 until it seats on the leading end 24 of the connector body 22. Panel engagement tangs 50 extend outward from the panel-engaging ring 30.

Figure 18:
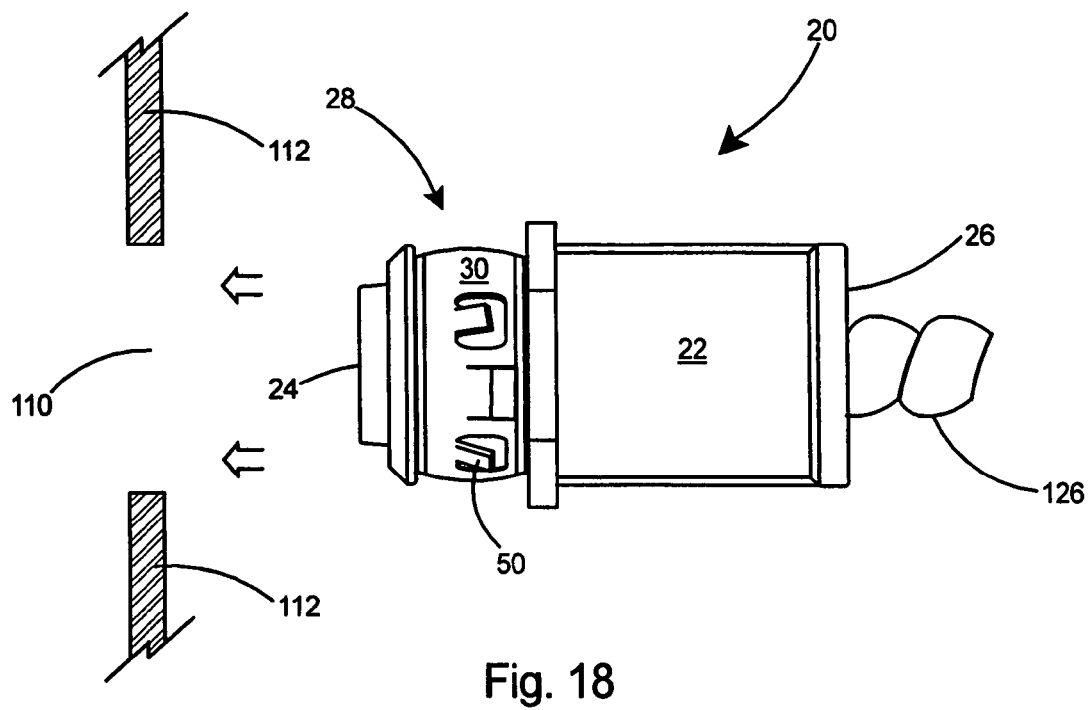
FIG. 18 is a side view of the first embodiment of an electrical fitting according to the present invention in alignment with a panel into which it will be pressed.

With reference to FIG. 18, the first embodiment of the electrical fitting 20 has a fastening arrangement 28 that includes a substantially cylindrical panel-engaging ring 30 on the leading end 24 of the connector body 22. The first embodiment of the electrical fitting 20 can be easily snapped into an aperture 110 in a panel 112 by simply pressing the leading end 24 of the connector body 22 into the aperture 110. The panel engagement tangs 50 are compressed by the panel 112 as they are pressed there through and snap outward to their unbiased position as they clear the panel 112, thereafter holding the connector body 22 securely to the panel.

Figure 19:
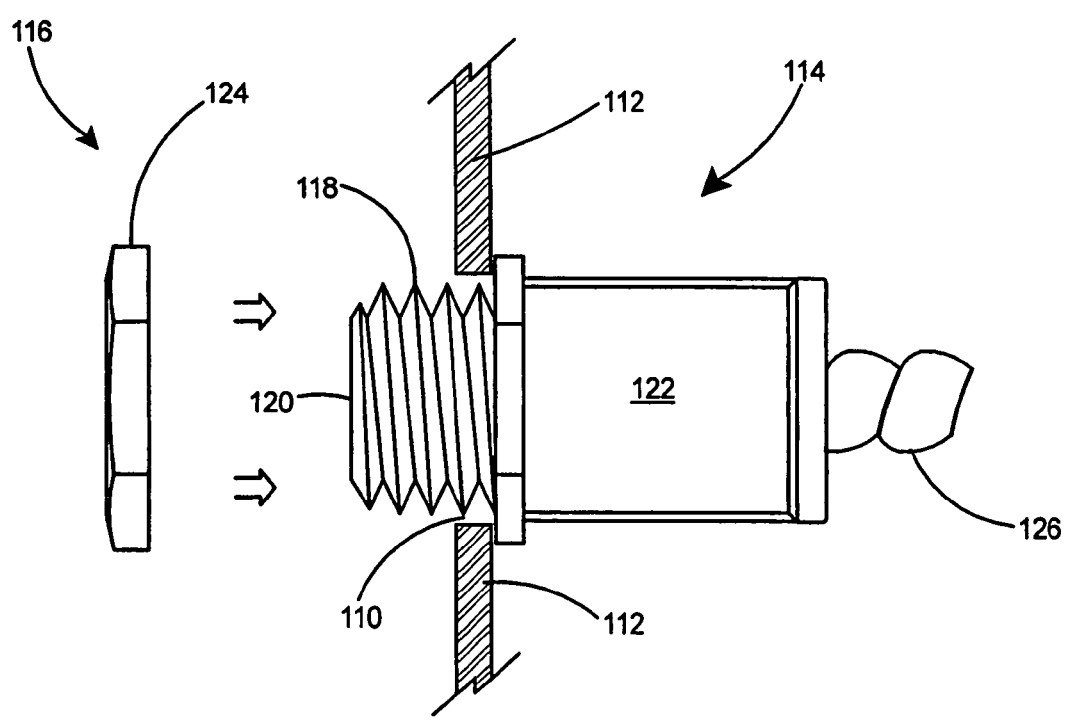
FIG. 19 is a side view of an alternate embodiment of an electrical fitting according to the present invention in alignment with a panel to which it will be secured by a locknut.

FIG. 19 depicts an alternative embodiment of the electrical fitting 114. The alternative embodiment of the electrical fitting 114 has a fastening arrangement 116 that includes threads 118 on the leading end 120 of the connector body 122 and a nut 124 for engaging the threads 118.

Figure 20:
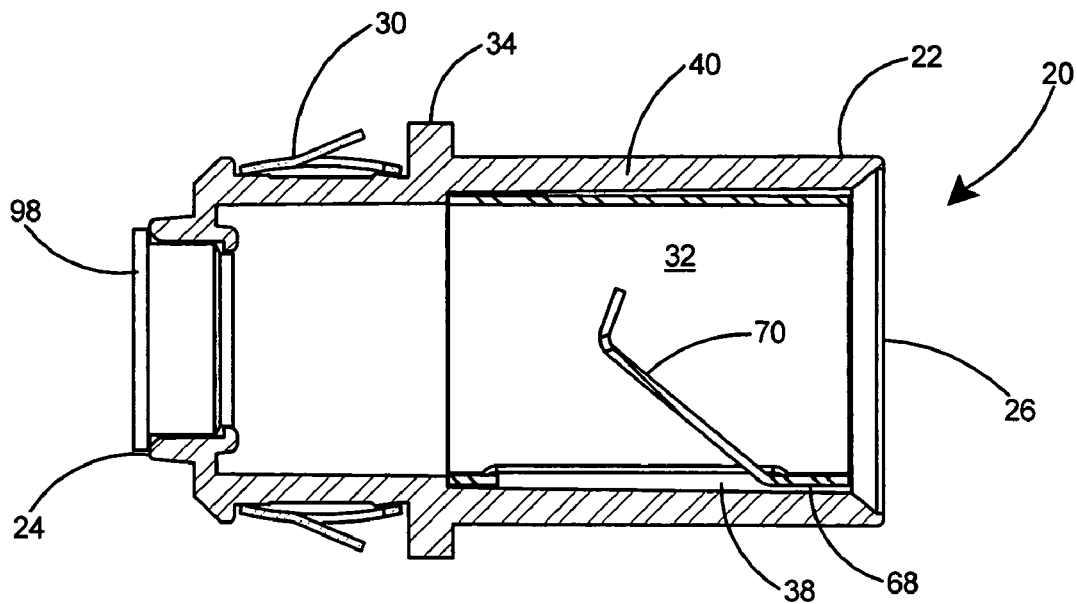
FIG. 20 is a sectional view of the first embodiment of the electrical fitting including a cable retainer secured in the trailing end of the connector body.
Figure 21:
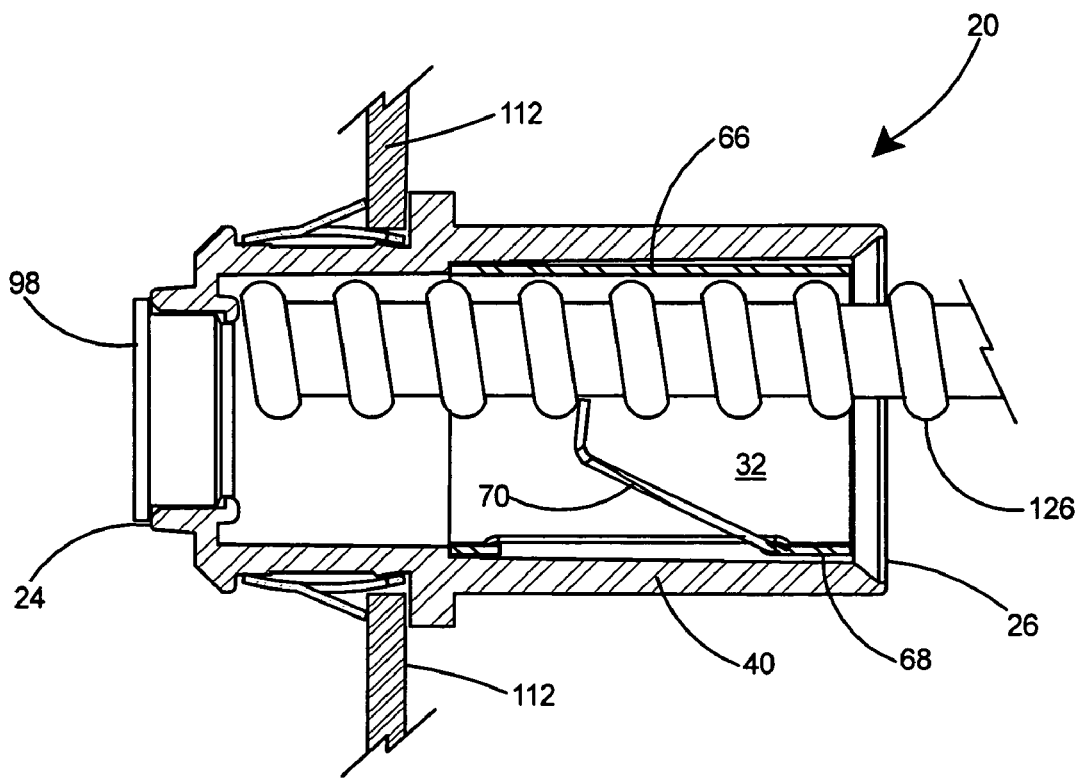
FIG. 21 is a sectional view of the electrical fitting of FIG. 17 but with a metal clad electrical cable secured and held therein in the trailing end of the connector body by the cable retainer.

Reference is made to FIGS. 20 and 21 for an understanding of the operation of a first embodiment of the electrical fitting 20 of the present invention. The electrical fitting 20 is provided as an assembly including the connector body 22, panel-engaging ring 30, cable retainer 32, and insert 98. With the cable retainer 32 locked into the cavity 38 at the trailing end 26 of the connector body 22, as shown in FIG. 20, the cable retaining tang 70 extends into the cavity 38 from the flat portion 68 of the cable retainer 32. After the electrical fitting 20 is connected to a panel 112, as shown in FIG. 21, an electrical cable 126 is inserted into the trailing end 26 of the fitting 20. Insertion of the electrical cable 126 biases the cable retaining tang 70 outward, thereby pressing the electrical cable 126 against the wall 40 of the connector body 22. The pressure exerted by the cable retaining tang 70 against the electrical cable 126 locks it within the connector body 22 and prevents its removal by a force applied rearward thereto to the cable.

As should be apparent from the above description with reference to the drawings, the electrical fitting of the present invention includes a cable retainer 32 that is of simplified construction, with a single cable retaining tang 70 projecting inward from the tubular body 66 of the cable retainer 32. The simplified construction enables the electrical fitting 20 to be manufactured at an economical cost. The cable retaining tang 70 of the electrical fitting 20 projects from a flat portion 68 of the cable retainer 32 and includes a straight bend line 62 (see FIG. 11) to enhance the flexibility of the tang 70 and thereby enable easy insertion of an electrical cable 126 within the trailing end 26 of the connector body 22.

With reference to FIG. 13, the single cable retaining tang 70 is of greater width and includes a wider cable gripping surface or profile, including U-shaped notch 90, arcuate edge 94 and flat edge 96, that improves the ability of the electrical fitting 20 to securely grip an electrical cable. In the first embodiment, the width D1 of cable retaining tang 70 is 0.375 inch and the inside diameter of the cable retainer 32 is 0.648 inch. The cable retaining tang 70 therefore spans 57% of the distance across the inner diameter of the ring. Most preferably, the cable retaining tang 70 spans at least 55% of the inner diameter of the cable retainer 32.

Figure 22:
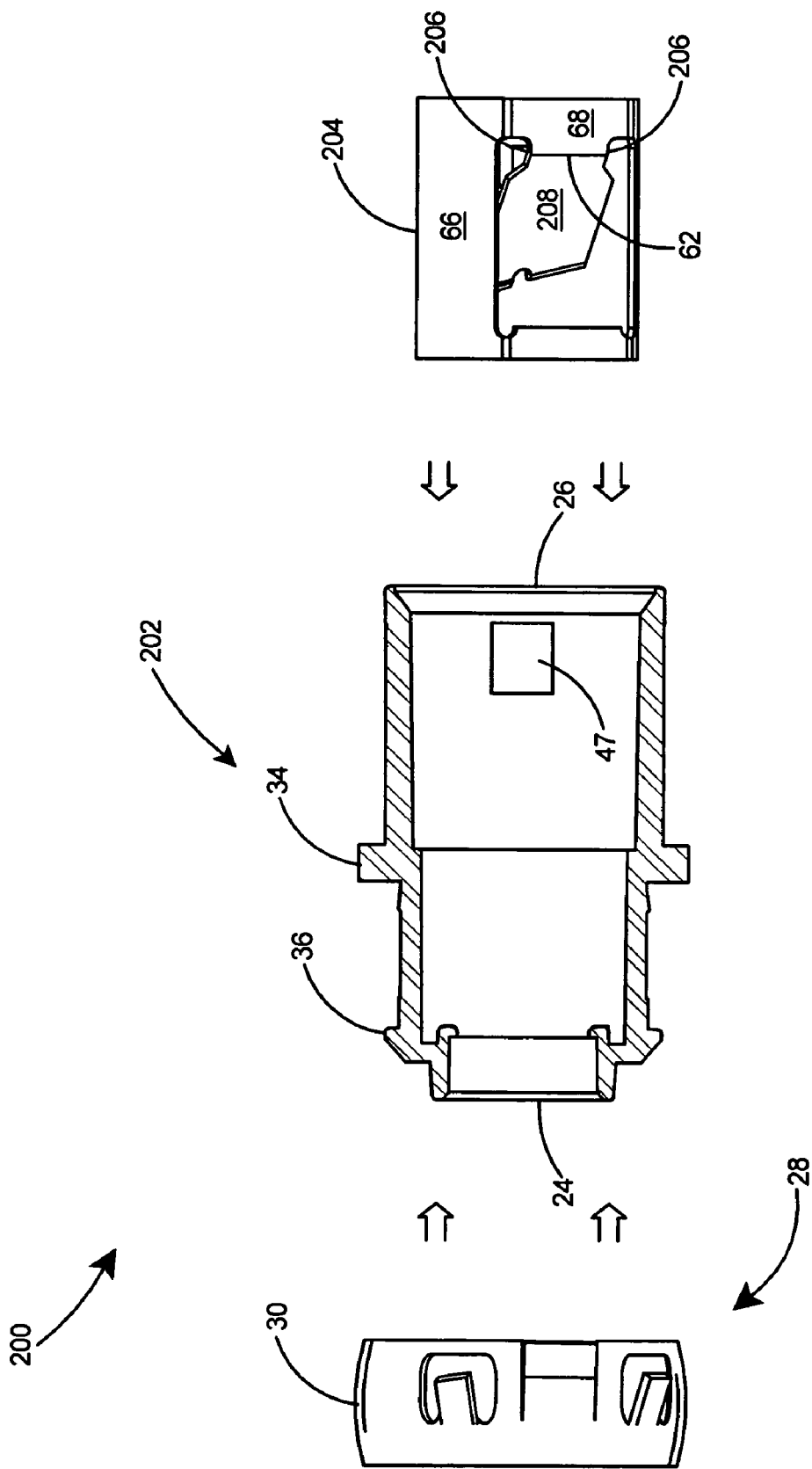
FIG. 22 is an exploded side view of a second and preferred embodiment of an electrical fitting according to the present invention.

With reference to FIG. 22 there is shown a second and preferred embodiment of the electrical fitting 200 of the present invention. The second embodiment of the electrical fitting 200 includes a further improved arrangement for securing electrical cables to a panel or electrical box. The second and preferred embodiment of the electrical fitting 200 includes a connector body 202 with a leading end 24 and a trailing end 26. The same reference numerals are used for those portions of the second embodiment that are equivalent to those shown in the first embodiment. A fastening arrangement 28 on the leading end 24 of the connector body 22 includes a cylindrical ring 30 for securing the connector body 202 to a panel (not shown). Alternatively, the fastening arrangement 116 could include a threaded nose 118 on the connector body and a locknut 124 as shown in FIG. 19. A second and preferred embodiment of a cable retainer 204 is inserted within the trailing end 26 of the connector body 22 to form the preferred embodiment of the electrical fitting 200. Cable retainer 204 includes notches 206 at the first bend line 62 to form a modified cable retaining tang 208 that includes substantially greater flexibility than the cable retaining tang of the first embodiment.

As shown in FIGS. 23-25, the second and preferred embodiment of the connector body 202 includes an opening 210 (see FIGS. 23 and 25) in the wall 40 of the connector body. The connector body 202 further includes a central flange 34 between the trailing end 26 and the leading end 24, an end flange 36 on the leading end 24, and a cavity 38 including a surrounding wall 40 in the trailing end 26. As shown in FIG. 25, the connector body 202 further includes a partial closure 42 on the leading end 24, an opening 44 in the partial closure 42, and edges 46 on the partial closure 42 surrounding the opening 44. An opening 47 (see FIG. 24) is provided in the surrounding wall 40 of the connector body.

Several advantages of the present invention are realized from the arrangement of the cable retainer 204 as shown in FIGS. 26-32. The second and preferred embodiment of the cable retainer 204 is formed from a flat blank 212 (see FIG. 26) of spring steel having two ends 56 and 58. The blank 212 includes bend lines 60 laterally across the blank 212, bend lines 62 and 63 longitudinally along the blank 212, and bend line 214 at an angle θ2 that is preferably between 10 and 20 degrees with respect to the edge 216 of the blank and most preferably at an angle of 15 degrees with respect to the edge 216 of the blank. The blank 212 of FIG. 26 will be formed into a substantially tubular body 222 as shown in FIGS. 27 and 28 but with a chord or flat portion 68 formed between bend lines 60. The cable retaining tang 208 is formed by bending inward of the tubular body 222 at bend line 62 and a locking tang 72 formed by bending outward of the tubular body 222 at bend line 63. The cable retaining tang 208 is bent inward a second time at bend line 214. Bending the cable retaining tang 208 a second time along bend line 214 positions the outward extending legs 218 parallel with the grooves of a conventional armored cable (not shown) and thereby enables the legs 218 of the cable retaining tang 208 to extend deeply into the groove of the armored cable. End legs 218 are therefore aligned with the grooves of an armored cable. Cable retaining tang 208 furthermore is provided with notches 206 at the edges of bend line 62 thereby reducing the amount of metal at bend line 62 and thereby increasing the flexibility of the cable retaining tang 208 in the second embodiment of the cable retainer ring 204 depicted in FIGS. 27 and 28. As shown in the end view in FIG. 31, cable retainer 204 is substantially circular but includes flat portion 68 that forms a chord across a portion of the tubular body 222.

Figure 33:
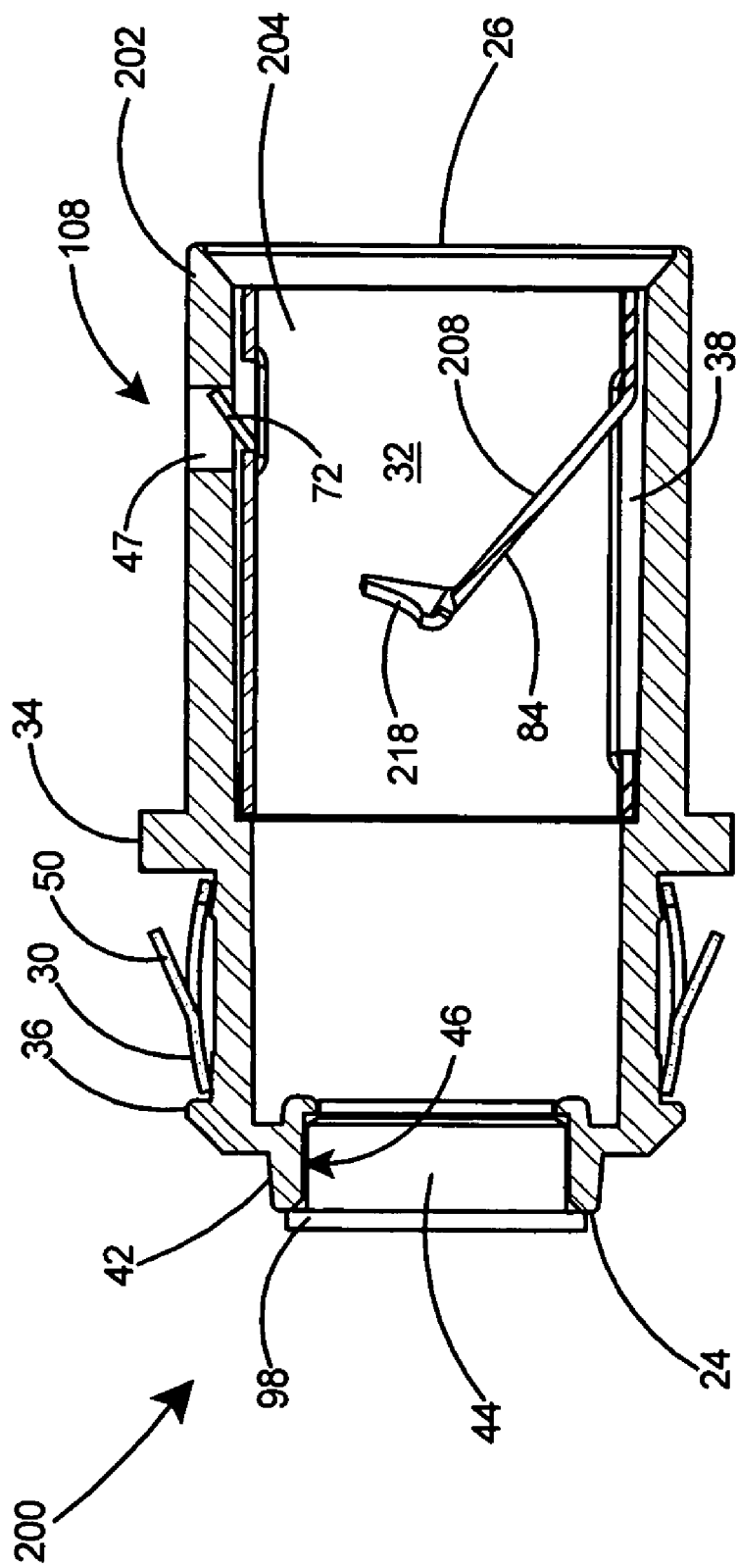
FIG. 33 is a sectional view of the preferred embodiment of the electrical fitting including a cable retaining tang secured in the trailing end of the connector body and the insert of FIG. 15 inserted in the leading end of the connector body.

As depicted in FIG. 33, securing arrangement 108 including locking tang 72 on cable retainer 204 and opening 47 in connector body 202 enable the cable retainer 204 to be locked within the cavity 38 in the trailing end 26 of the connector body 202. As the cable retainer 204 is typically formed of spring steel and is a split ring, it can be compressed or biased inwards and inserted into the cavity 38 at the trailing end 26 of the connector body 202. The locking tang 72 of the cable retainer 204 is aligned with the opening 47 in the trailing end 26 of the connector body 202 as the cable retainer 204 is compressed and inserted therein. After the cable retainer 204 has been inserted into the cavity 38, the cable retainer 204 is released and springs outward to its unbiased shape and the locking tang 72 extends into the opening 47 in the connector body 202 thereby locking the cable retainer 204 within the cavity 38.

With reference to FIG. 33, ring 30 at the leading end 24 of the fitting 200 is typically constructed of spring steel and is biased outward or expanded in size and slipped over end flange 36 of the connector body 202 until it seats on the leading end 24. Panel engagement tangs 50 extend outward from ring 30.

Figure 34:
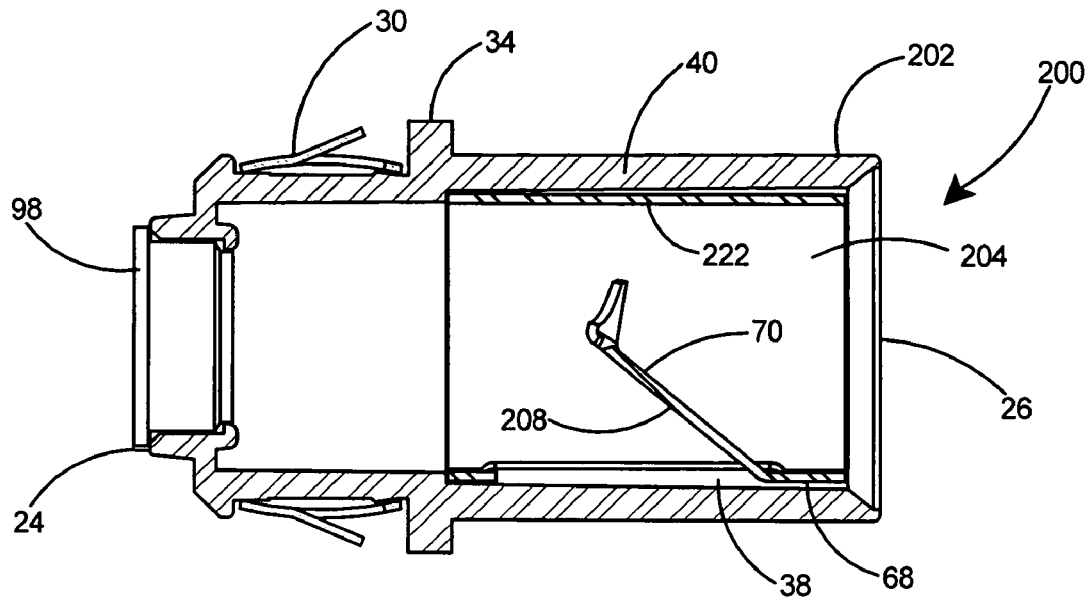
FIG. 34 is a sectional view of the second and preferred embodiment of the electrical fitting including a cable retainer secured in the trailing end of the connector body.
Figure 35:
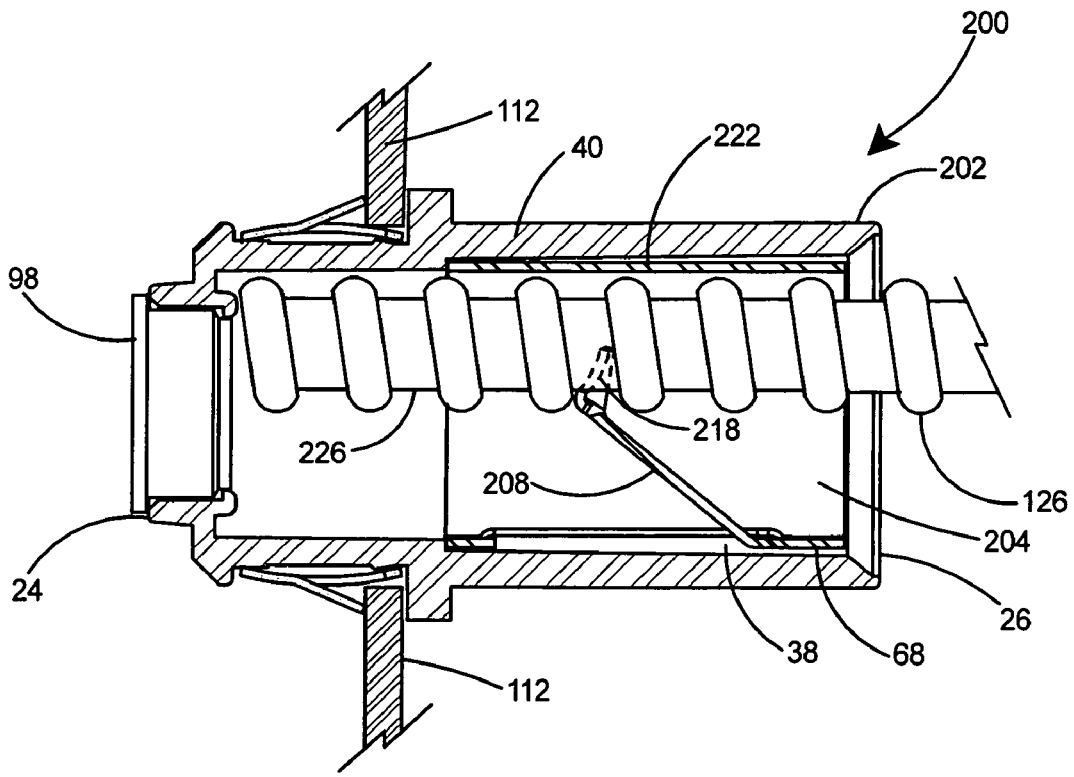
FIG. 35 is a sectional view of the electrical fitting of FIG. 34 but with a metal clad electrical cable secured and held therein in the trailing end of the connector body by the preferred embodiment of the cable retainer.

Reference is made to FIGS. 34 and 35 for an understanding of the operation of the preferred embodiment of the electrical fitting 200 of the present invention. The electrical fitting 200 is provided as an assembly including the connector body 202, panel-engaging ring 30, cable retainer 204, and insert 98. With the cable retainer 204 locked into the cavity 38 at the trailing end 26 of the connector body 202, as shown in FIG. 34, the cable retaining tang 208 extends into the cavity 38 from the flat portion 68 of the cable retainer 204. The electrical fitting may then be connected to a panel 112 by one of the arrangements shown in either FIG. 18 or 19. As shown in FIG. 35, an electrical cable 126 is then inserted into the trailing end 26 of the fitting 200. Insertion of the electrical cable 126 biases the cable retaining tang 208 outward, thereby pressing the electrical cable 126 against the wall 40 of the connector body 202. The end legs 218 of cable retaining tang 208, being in alignment with the grooves 226 in the cable 126, find and extend into the grooves as the cable 126 is inserted within the electrical fitting 200. The pressure exerted by the end legs 218 of the spring steel cable retaining tang 208 against the electrical cable 126 thereby lock the electrical cable 126 securely within the connector body 202. The electrical fitting 200 provides excellent strain relief for the electrical cable 126, locking it firmly within the fitting 200 and preventing removal by a force applied rearward thereto to the cable 126. Thus, the security of the electrical connections within the panel or electrical box (not shown) are not compromised by accidental strain forces applied to the cable.

Figure 36:
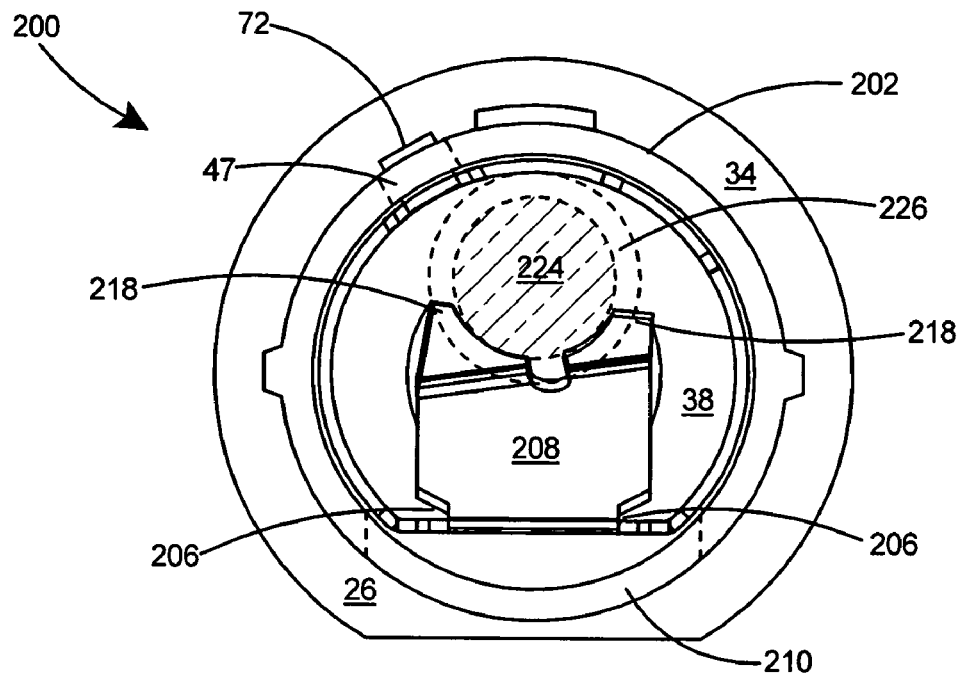
FIG. 36 is an end view of the electrical fitting of FIG. 35 from the trailing end of the fitting depicting the cable retaining tang holding a small-diameter cable securely within the fitting.
Figure 37:
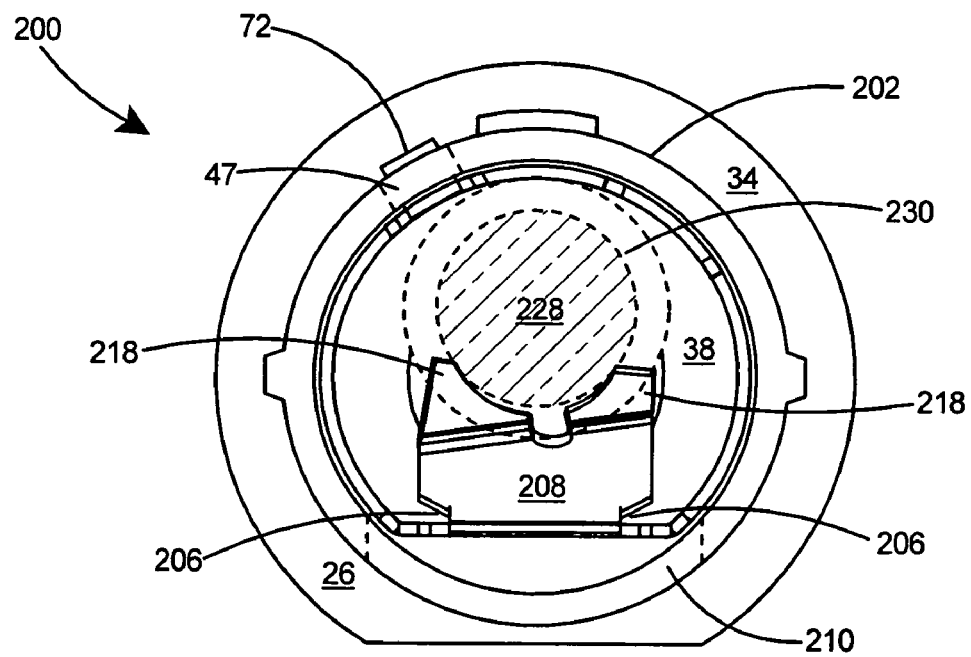
FIG. 37 is an end view of the electrical fitting from the trailing end similar to FIG. 36 but depicting the cable retaining tang holding a larger diameter cable.

FIGS. 36 and 37 depict two possible arrangements of electrical cable connected to the trailing end 26 of the preferred embodiment of the electrical fitting 200. FIG. 36 depicts in dashed lines a small diameter cable 224 having grooves 226 therein. As the electrical cable 224 is pushed into the fitting 200, the cable retaining tang 208 is biased outwards by the cable 224 and the end legs 218 of the cable retaining tang 208 snap fit into the grooves 226 as a result of the outward biasing pressure placed upon the flexible tang 208. After the electrical cable 224 is advanced fully into the cavity 38, the cable 224 is firmly locked into the fitting by the cable-retaining tang 208.

FIG. 37 depicts in dashed lines a larger diameter cable 228 having grooves 230 therein. As shown by FIGS. 36 and 37, the electrical fitting 200 of the present invention, as a result of its construction and the resilience of the cable retaining tang 208, can accommodate several sizes of electrical cable. Notches 206 are large enough to enhance the flexibility of the cable-retaining tang 208 but are not so large as to detract from the strain relief properties of the fitting.

Referring to FIG. 38 there is shown a plan view of the preferred embodiment of the cable-retaining tang as viewed from line 38-38 of FIG. 32. The two legs 218L and 218R are defined by bend lines 214L and 214R respectively. As shown in FIG. 39, the left leg 218L is bent inward by angle θ3 along bend line 214L. As shown in FIG. 40, right leg 218R is bent inward by angle θ4 along bend line 214R. Angle θ3 of left leg 218L is preferably between 100 and 120 degrees or most preferably is 110 degrees. Angle θ4 of right leg 218R is preferably between 140 and 160 degrees or most preferably is 150 degrees. Thus, each leg 218L and 218R at the end of the cable-retaining tang 218 is preferably bent inward at a different angle. Also, left leg 218L is of a length D3 that is preferably about twice the length D4 of leg 218R.

Therefore, as shown in FIG. 41, when the cable retainer 204 is viewed with respect to an inserted metal clad electrical cable 126, the angle θ2 of the second bend line 214 with respect to edge of the cable retainer 204 aligns legs 218L and 218R with the groove 76. Leg 218L, having length D3 and bent at angle θ3 (see FIG. 39), extends an optimal distance into the groove 76 to bottom out in the groove on the left side of the cable 126. Leg 218R, having length D4 and bent at angle θ4 (see FIG. 40), extends the optimum distance into groove 76 to bottom out in the groove on the right side of cable 126. The angles θ3 and θ4 and lengths D3 and D4 of the left 218L and right 218R legs provide excellent retaining force and strain relief for the electrical cable 126.

Preferably the connector bodies 22 and 202 of the present invention are constructed of metal and most preferably of Zamak™, a casting alloy comprised mainly of zinc alloyed with aluminum, magnesium, and copper and available from Eastern Alloys, Maybrook, N.Y. By constructing the tubular body of Zamak™ or other appropriate metals, the connector bodies 22, 202 will be electrically conductive and provide good continuity between the panel, the fitting, and the inserted electrical cable. The ring 30 and cable retainers 32 and 204 are preferably constructed of spring steel to impart toughness, resilience, and flexibility to the various tangs located thereon. The insert 98 is preferably constructed of plastic and functions as an antishort bushing to prevent any electrical wires extending through the leading opening of the connector body from fraying, or shorting out against the connector body. The electrical fittings 20 and 200 presented herein are used to secure electrical cables such as metal clad (MC), flex cable, or continuous corrugated MC cable to a panel.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. An electrical fitting comprising:
   a connector body including a leading end and a trailing end;
   a fastening arrangement on said leading end for securing said leading end of said connector body to a panel;
   a cavity in said trailing end of said connector body, said connector body including a surrounding wall;
   a tubular cable retainer secured within said cavity, said cable retainer including edges;
   a securing arrangement for locking said cable retainer within said cavity of said trailing end of said connector body;
   said cable retainer including a flat portion thereon;
   a single cable-retaining tang projecting inward from said flat portion of said cable retainer;
   said cable-retaining tang includes edges and a juncture at said flat portion of said cable-retainer; and
   said edges of said cable-retaining tang include notches in said edges of said cable-retaining tang at said juncture with said flat portion of said cable-retainer.

2. The electrical fitting of claim 1 including
   two end legs on said cable-retaining tang;
   a U-shaped notch separating said end legs; and
   said end legs are bent inward of said cable retainer.

3. The electrical fitting of claim 2 wherein said end legs include a bend line at an angle with respect to said edges of said cable retainer.

4. The electrical fitting of claim 3 wherein said angle of said bend line with respect to said edges of said cable retainer is between 10 and 20 degrees.

5. The electrical fitting of claim 1 wherein said securing arrangement for said cable retainer includes
   an opening in said surrounding wall in said trailing end of said connector body;
   a locking tang projecting outward from said cable retainer, said locking tang in alignment with said opening in said wall of said connector body;
   said locking tang having an end thereon, said end of said locking tang extending toward said trailing end of said connector body; and
   an outward bias of said cable retainer against said wall of said cavity, whereby said locking tang projects through said opening of said connector body and locks said cable retainer within said cavity of said connector body.

6. The electrical fitting of claim 1 wherein
   said cable-retaining tang includes a left leg, a right leg, and a central axis;
   said left leg is bent inward toward said central axis by an angle between 100 and 120 degrees; and
   said right leg is bent inward toward said central axis by an angle between 140 and 160 degrees.

7. The electrical fitting of claim 6 wherein said left leg is twice the length of said right leg.

8. The electrical fitting of claim 1 wherein said connector body includes
   a central flange between said trailing end and said leading end; and
   an end flange on said leading end of said connector body.

9. The electrical fitting of claim 1 including
   a partial closure on said leading end of said connector body;
   an opening in said partial closure;
   edges on said partial closure surrounding said opening; and
   an insert in said opening, said insert substantially covering said edges of said partial closure.

10. The electrical fitting of claim 9 wherein
    said connector body is constructed of metal; and
    said insert is constructed of plastic.

11. The electrical fitting of claim 1 wherein said fastening arrangement includes a cylindrical panel-engaging ring on said leading end of said connector body.

12. The electrical fitting of claim 1 wherein said fastening arrangement includes
    threads on said leading end of said connector body; and
    a nut for engaging said threads on said leading portion.

* * * * *